United States Patent

[11] 3,603,228

| [72] | Inventors | Rudolf Kremp<br>Gruenwald;<br>Ernst Friedlaender, Leverkusen-<br>Bayerwerk; Alfred Winkler, Munich, all of,<br>Germany |
|---|---|---|
| [21] | Appl. No. | 20,274 |
| [22] | Filed | Mar. 17, 1970 |
| [45] | Patented | Sept. 7, 1971 |
| [73] | Assignee | AGFA-Gevaert Aktiengesellschaft<br>Leverkusen, Germany |
| [32] | Priority | Mar. 19, 1969 |
| [33] | | Germany |
| [31] | | P 19 13 865.9 |

[54] CAMERA RELEASE MEANS
14 Claims, 2 Drawing Figs.

[52] U.S. Cl. .................................................... 95/11 R,
200/61.85
[51] Int. Cl. ........................................................ G03b 17/00

[50] Field of Search............................................ 95/10 C,
11; 200/52, 61.58, 61.85, 168

[56] References Cited
UNITED STATES PATENTS

| 3,186,319 | 6/1965 | Hochstein .................... | 95/10 C |
| 3,220,326 | 11/1965 | Scuprer......................... | 95/10 C |
| 3,307,460 | 3/1967 | Land ............................. | 95/10 C |

*Primary Examiner*—Joseph F. Peters, Jr.
*Attorney*—Michael S. Striker

ABSTRACT: A camera wherein the shutter is opened in response to closing of a first electric switch on deformation of a diaphragm which also effects movement of a holder for the switch with reference to the camera housing to thereby actuate a second switch or a mechanical device which triggers the operation of the exposure control or of an indicator for scene brightness. The holder is movable against the opposition of a spring or a rubber ring which yields to permit closing of the second switch or the operation of the mechanical device before the diaphragm closes the first switch.

3,603,228

CAMERA RELEASE MEANS

CROSS-REFERENCE TO RELATED APPLICATIONS

The camera release means of the present invention constitutes an improvement over and a further development of the structure which is disclosed in the copending application Ser. No. 749,170 filed July 31, 1968 by Alfred Winkler et al. and assigned to the same assignee.

BACKGROUND OF THE INVENTION

The present invention relates to photographic cameras in general, and more particularly to improvements in release means for still cameras or motion-picture cameras. Still more particularly, the invention relates to photographic cameras of the type wherein the release means for the shutter includes a diaphragm which is deformable by hand to thereby open the shutter of a still camera or to start the motor which drives the shutter in a motion-picture camera.

SUMMARY OF THE INVENTION

An object of the invention is to provide a motion-picture camera or a still camera with release means which enables the user to initiate several operations in a desired sequence or to initiate a single operation without making an exposure if the result of the single operation is indicative that no satisfactory exposure can be made at the prevailing scene brightness and/or with the available film.

Another object of the invention is to provide a camera release wherein a single element suffices to initiate several operations in such a way that the user has an option to initiate one or more operations.

A further object of the invention is to provide novel means for opening the shutter and for activating an automatic exposure control or an automatic indicator of scene brightness in a still camera or motion-picture camera.

An additional object of the invention is to provide simple, compact and versatile release means for still cameras or motion-picture cameras.

Still another object of the invention is to provide a motion-picture camera or a still camera wherein the user can select and vary the intervals of time between the activation of an exposure control or scene brightness indicator and the opening of the shutter or the starting of film-transporting means.

An ancillary object of the invention is to provide novel and improved release means for cameras of the type wherein the shutter is actuated by current-consuming means, such as an electromagnet or an electric motor.

A further object of the invention is to provide release means which can be readily installed in or removed from the housing of a photographic camera and which can be rapidly and conveniently taken apart or reassembled with simple tools.

The invention is embodied in a photographic camera which comprises preferably sleevelike holder means movable with reference to the camera housing between first and second positions, first camera-actuating means (e.g., a normally open electric switch or a mechanical device including one or more links, levers, pushers or the like) operable in response to movement of the holder means to second position, biasing means (e.g., a spring or a ring of natural or artificial rubber) arranged to urge the holder means to first position, second camera-actuating means (e.g., a microswitch which can energize an electromagnet or start an electric motor) provided on the holder means, and diaphragm means mounted on the holder means and being deformable to thereby operate the second actuating means in response to the application of a stress in a direction to effect movement of holder means to second position.

The arrangement is preferably such that the force which is necessary to operate the second actuating means is greater or less than the force required to move the holder means to second position so that the user of the camera can determine the exact moment when one of the actuating means is operated and can thereupon decide whether or not to initiate operation of the other actuating means.

The novel features which are considered as characteristic of the invention are set forth in particular in the appended claims. The improved photographic apparatus itself, however, both as to its construction and its mode of operation, together with additional features and advantages of its release means, will be best understood upon perusal of the following detailed description of certain specific embodiments with reference to the accompanying drawing.

DESCRIPTION OF THE PREFERRED EMBODIMENTS

Figure 1:
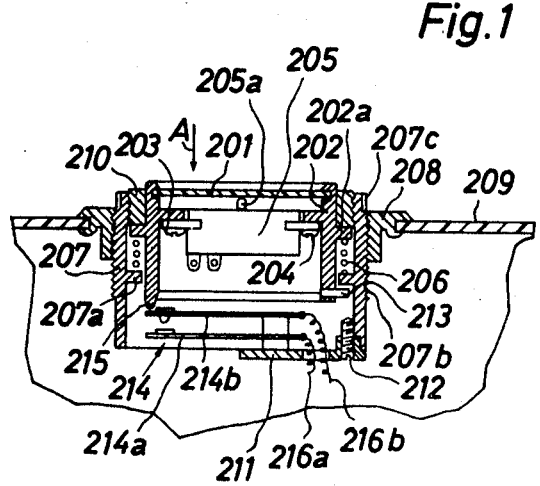
FIG. 1 is a central sectional view of camera release means which embodies one form of the invention.

Referring first to FIG. 1, there is shown a wall 209 which constitutes a support for the improved camera release means and forms part of the housing of a still camera or the body or handle of a motion-picture camera. A preferably circular opening in the wall 209 accommodates an internally threaded supporting ring 208 which meshes with external threads 207b of an outer holder 207 (hereinafter called cylinder for short) which accommodates an axially movable inner holder 202 (hereinafter called sleeve). The outer axial end of the sleeve 202 is closed by a deformable diaphragm 201 of elastomeric synthetic plastic material which is outwardly adjacent to a camera-actuating device 205 here shown as a microswitch which is secured to an internal flange of the sleeve 202 by screws 203, 204 or analogous fasteners and has a depressible portion 205a adjacent to the inner side of the diaphragm 201. The sleeve 202 is further provided with an external flange 202a which is biased by a helical spring 206 serving as a means for maintaining the sleeve in the illustrated end position in which the flange 202a abuts against an externally threaded ring 210 meshing with the cylinder 207 and enabling the operator to adjust the axial position of the sleeve 202 as well as to adjust the bias of the spring 206. The spring 206 reacts against an internal flange 207a of the cylinder 207, i.e., the spring 206 is confined between the sleeve and cylinder and automatically returns the sleeve 202 to the end position of FIG. 1 as soon as the user of the camera terminates a deforming stress acting on the diaphragm 201 in the direction indicated by arrow A. The ring 210 constitutes an adjustable stop which determines the illustrated end position of the sleeve 202. The other end position of this sleeve is determined by a second adjustable stop here shown as a screw 212 which meshes with a platform or bracket 211 of the cylinder 207 and engages a radial projection 213 of the sleeve 202 when the latter is moved downwardly, as viewed in FIG. 1, to stress the spring 206.

The bracket 211 serves as a carrier for a second actuating means 214 which is a normally open electric switch having springy contacts 214a, 214b connected with conductors 216a, 216b. The sleeve 202 has a downwardly extending portion or trip 215 which moves the contact 214b against the contact 214a when the spring 206 is compressed whereby the switch 214 completes an electric circuit in the camera.

When the user applies finger pressure against the outer side of the diaphragm 201 (arrow A), the diaphragm causes the sleeve 202 to move against the opposition of the spring 206 until the projection 213 strikes against the tip of the screw 212. In such end position of the sleeve 202, its trip 215 closes the switch 214 which can be connected in circuit with an automatic exposure control serving to determine the exposure time and/or aperture size as a function of scene brightness. The switch 214 can also complete the circuit of an indicator (e.g., a lamp which is observable in the viewfinder of the camera) to indicate to the user whether or not the scene brightness is satisfactory for making of an acceptable exposure. Further finger pressure against the outer side of the diaphragm 201 results in such deformation of the diaphragm that the latter depresses the portion 205a and thereby closes the microswitch 205 which can energize an electromagnet serving to open the shutter of a still camera or complete the circuit of an electromotor which drives the shutter in a motion-picture camera. The arrangement is preferably such that the user of the camera "feels" when the projection 213 strikes against the stop screw 212 so that he or she can thereupon make a decision whether or not to increase the finger pressure against the diaphragm 201 to the extent which is necessary to close the microswitch 205 and to thereby open the shutter or to start the motor. This particularly desirable when the switch 214 serves as a means for completing the circuit of the aforementioned indicating device which can inform the user whether or not the scene brightness is satisfactory for making of exposures with the film which is contained in the camera. Such indicating device can also serve as a means for indicating to the user whether or not a satisfactory exposure can be made with the camera held by hand. If the signal indicates that no satisfactory exposure can be made while the camera is held by hand, the user knows that a tripod is needed and the user thereupon relaxes the finger pressure on the diaphragm so that the switch 205 remains open.

The camera release is further provided with means which enables the user to adjust the axial position of the cylinder 207 with reference to the wall 209. Such adjusting means includes a knurled or milled portion 207c which can be engaged by fingers to facilitate rotation of the cylinder 207 with reference to the ring 208 so as to place the diaphragm 201 into an optimum position for convenient actuation by a particular user. Thus, the cylinder 207 can be adjusted, together with the sleeve 202 and diaphragm 201, to account for the morphological characteristics of the user (such as the length and/or shape of his or her fingernails or the like).

The resistance which must be overcome to close the microswitch 205 depends on the deformability of the diaphragm 201 and/or on the strength of the spring or springs which urge the portion 205a of the switch 205 to the illustrated extended position. Thus, the diaphragm 201 can consist of readily deformable material if the spring in the casing of the microswitch 205 is rather strong, or the microswitch can use a very weak spring if the diaphragm is designed to offer substantial resistance to deformation, i.e., a resistance which is greater than that of the spring 206.

It is clear, however, that the structure of FIG. 1 can employ a spring 206 which is sufficiently strong to insure that the microswitch 205 is closed prior to closing of the switch 214. For example, if the diaphragm 201 is readily deformable and the spring in the casing of the microswitch 205 is rather weak, the application of a stress in the direction indicated by arrow A results in immediate closing of the switch 205 whereby the portion 205a is pushed entirely into the casing so that the inner side of the deformed diaphragm bears against the outer side of the casing while the sleeve 202 moves inwardly to deform the spring 206 and to close the switch 214.

Figure 2:
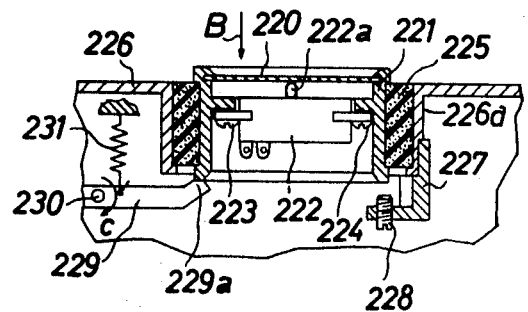
FIG. 2 is a similar sectional view of second camera release means.

FIG. 2 illustrates a second camera release which is mounted in a support or wall 226 forming part of the housing in a still camera or motion-picture camera. In this embodiment of the invention, the outer holder 226a is a cylinder which forms an integral part of the wall 226 and is provided with a bracket 227 for a stop 228 here shown as a screw which is adjustable axially toward and away from the inner end face of an inner holder or sleeve 221. The means for biasing the sleeve 221 to the illustrated end position comprises a ring 225 of natural or synthetic rubber which is preferably bonded to the cylinder 226a and sleeve 221 and is capable of undergoing such deformation as is necessary to move the sleeve into abutment with the stop screw 228. The outer end of the sleeve 221 is closed by a deformable diaphragm 220 which is outwardly adjacent to the depressible portion 22a of a microswitch 222 whose casing is mounted in the sleeve 221 and is secured thereto by screws 223, 224 or like fasteners. The microswitch 22 constitutes one camera-actuating means; the other camera-actuating means which is operated in response to movement of the sleeve 221 to that end position in which it abuts against the stop screw 228 includes a mechanical device here shown as comprising a lever 229 which is pivotable in the housing of the camera, as at 230, and and has a pallet 229 a which is biased against the inner end face of the sleeve 221 by a relatively weak helical return spring 231.

When the user stresses the diaphragm 220 by the application of finger pressure in the direction indicated by arrow B, the diaphragm pushes the sleeve 221 and the microswitch 22 downwardly, as viewed in FIG. 2, to deform the rubber ring 225 and to move the sleeve into abutment with the screw 228 whereby the lever 229 pivots in the direction indicated by arrow C to thereby initiate a particular operation, for example, closing of a switch which forms part of an indicating device or an automatic exposure control. Further finger pressure against the outer side of the diaphragm 220 results in closing of the microswitch 22 which thereby opens the shutter of a still camera or completes the circuit of a motor which drives the film-transporting mechanism and the shutter of a motion-picture camera. Thus, here again, the force which is necessary to close the microswitch 222 exceeds the force which is necessary to deform the ring 225 and to thereby operate the actuating means including the movable member 229.

It is clear, however, that the switch 222 can perform the function of the lever 229, i.e., that the release means of FIG. 2 can be designed in such a way that the switch 222 closes first and that the ring 225 is deformed in response to a stronger finger finger pressure against the diaphragm 220 to thereby move the lever 229 from the illustrated idle position to its operative position. It is also clear that each of the four illustrated actuating means 205, 214, 222, 229 may comprise two or more discrete actuating devices which are operated simultaneously or in a desired sequence. For example, a further switch can be closed in response to engagement between the sleeve 221 and stop screw 228 of FIG. 2 prior to closing of the microswitch 222. All such modifications are so obvious in view of the preceding disclosure that they can be readily comprehended without additional illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claim.

1. In a photographic camera, combination comprising holder means movable between first and second positions; first camera-actuating means operable in response to movement of said holder means to second position; biasing means arranged to urge said holder means to first position; second camera-actuating means provided on said holder means; and diaphragm means mounted on said holder means and being deformable to thereby operate said second actuating means in response to the application of a stress in a direction to effect movement of said holder means to second position.

2. A combination as defined in claim 1, wherein said biasing means comprises spring means.

3. A combination as defined in claim 1, wherein said biasing means consists of rubber.

4. A combination as defined in claim 1, wherein at least one of said actuating means comprises an electric switch.

5. A combination as defined in claim 1, wherein each of said actuating means comprises a normally open electric switch.

6. A combination as defined in claim 1, wherein one of said actuating means comprises a member movable from an idle position to an operative position in response to the application of said stress.

7. A combination as defined in claim 6, wherein said member is a lever which is pivotable between said idle and operative positions thereof, and further comprising means for biasing said lever to idle position.

8. A combination as defined in claim 1, wherein the force necessary to effect operation of said second actuating means exceeds the force which is required to move said holder means to second position so that said first actuating means is operated ahead of said second actuating means in response to the application of said stress.

9. A combination as defined in claim 1, further comprising a support and second holder means mounted in said support, said first-mentioned holder means being movably mounted in said second holder means.

10. A combination as defined in claim 9, further comprising means for adjusting the position of said second holder means with reference to said support.

11. A combination as defined in claim 9, wherein said first actuating means is mounted on said second holder means.

12. A combination as defined in claim 9, wherein each of said holder means comprises an annular member and wherein the annular member of said first-mentioned holder means is movable substantially axially of and is received in the annular member of said second holder means, said support constituting the housing of the camera and said second actuating means comprising an electric switch accommodated in the annular member of said first-mentioned holder means.

13. A combination as defined in claim 12, wherein said second holder means comprises stop means for arresting said first-mentioned holder means in at least one of said positions thereof.

14. A combination as defined in claim 13, wherein said biasing means is interposed between said annular members.